United States Patent [19]

Wentz, III

[11] Patent Number: 4,818,084
[45] Date of Patent: Apr. 4, 1989

[54] SINGLE EYEPIECE BINOCULAR MICROSCOPE

[76] Inventor: John B. Wentz, III, 8619 Skyline Blvd., Oakland, Calif. 94611

[21] Appl. No.: 220,350

[22] Filed: Jul. 14, 1988

Related U.S. Application Data

[63] Continuation of Ser. No. 058,422, Jun. 5, 1987, abandoned.

[51] Int. Cl.$^4$ .................. G02B 21/36; G02B 21/00
[52] U.S. Cl. ............................ 350/508; 350/572; 350/145; 353/39
[58] Field of Search ............ 350/508, 503, 504, 505, 350/507, 538, 572, 576, 145, 137, 514, 515, 516; 353/39

[56] References Cited

U.S. PATENT DOCUMENTS

| | | | |
|---|---|---|---|
| 2,307,951 | 1/1943 | Plaut et al. | 350/507 |
| 2,891,444 | 6/1959 | Ewald | 350/576 |
| 4,691,997 | 9/1987 | Muchel | 350/503 |

FOREIGN PATENT DOCUMENTS

| | | | |
|---|---|---|---|
| 232793 | 4/1925 | United Kingdom | 350/508 |
| 788270 | 12/1957 | United Kingdom | 350/508 |

*Primary Examiner*—Jon W. Henry
*Attorney, Agent, or Firm*—Townsend & Townsend

[57] ABSTRACT

A single eyepiece binocular microscope includes a microscope housing a generally horizontal base and housing several optical elements. An objective lens is positioned immediately above the specimen and adjacent the base plane. A first mirror, vertically above the objective lens, redirects the light down and away from the observer along a path to intersect a second mirror positioned adjacent the base plane. The second mirror redirects the light along a third light path up and towards the observer for intersection with a rear projection screen. A viewing chamber shields the screen from ambient light for a brighter image and for an illusion of depth. A second lens, positioned just behind the real image of the first lens, provides a real image at the screen. A third lens at the viewing opening creates a virtual image between the second mirror and the rear projection screen to aid the impression of depth. The arrangement provides an impression to the viewer of looking into the instrument and at the specimen, an important consideration for use by children.

10 Claims, 1 Drawing Sheet

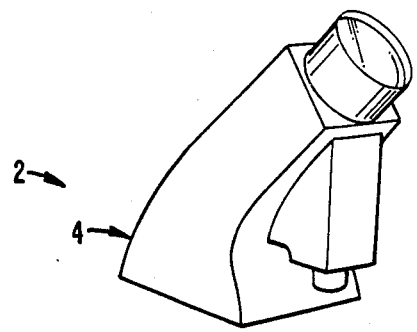
FIG._1.
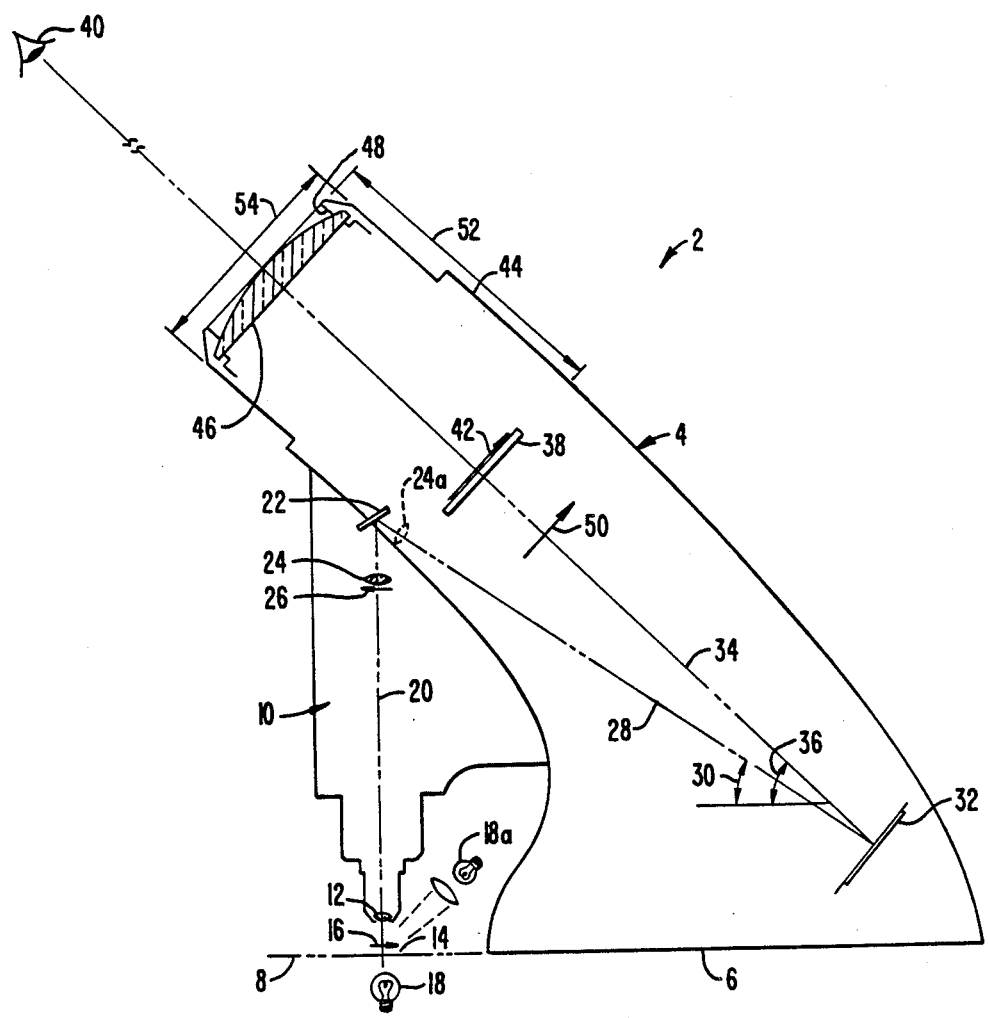
FIG._2.

SINGLE EYEPIECE BINOCULAR MICROSCOPE

This is a continuation of application Ser. No. 07/058,422, filed June 5, 1987, now abandoned.

BACKGROUND OF THE INVENTION

Microscopes are often purchased for children to acquaint them with things small. Children's microscopes are, for the most part, inexpensive versions of more expensive adult microscopes. However, physiologically and emotionally children are not simply small adults. Conventional microscopes are often quite difficult for children and even many adults to use. The special problems children have with conventional microscope designs seem to have been ignored in the design of microscopes for children or the casual user. The child user therefore often gets frustrated and losses interest so the microscope sits on the shelf, unused.

SUMMARY OF THE INVENTION

Present invention is directed to a relatively simple single eyepiece binocular microscope suitable for use by children and untrained adults.

The microscope includes a housing having a generally horizontal base and containing an optical train. Optical train includes an objective lens positioned immediately above the specimen receiving area. the specimen receiving area typically being generally aligned with the base plane. The optical train also includes a first mirror vertically above the objective lens to define a first, vertical light path between the two. The first mirror is positioned to redirect the light along a second light path which extends down and away from the user at an acute angle to the horizontal base plane. The second light path intersects a second mirror positioned adjacent the base plane. The second mirror redirects the light along a third light path for intersection with a rear projection screen positioned along the third light path. The rear projection screen coincides with the real image produced by the optical train. The third light path extends up and towards the user at an acute, viewing angle to the horizontal base plane to aid viewing by the user. The objective lens and the two mirrors constitute the optical train.

The opaque housing includes a viewing chamber, open at both ends, along the third light path and above the rear projection screen. The viewing chamber has a large diameter viewing chamber opening through which the specimen is observed. The axial length of the viewing chamber is sufficient to help screen ambient light from the rear projection screen for a brighter image. The diameter of the viewing chamber is sufficient to enable the user to see the rear projection screen with both eyes. The viewing opening may be a variety of shapes including, but not limited to, round, oval, rectangular or kidney shaped.

A second lens may be used near the first mirror, typically along the first light path. In such case the first lens produces a real image just in front of the second lens and the second lens produces the real image that coincides with the rear projection screen. In an alternate embodiment, the second lens is positioned between the first and second mirrors. A third lens may be positioned within the viewing chamber, typically at the viewing opening, for further magnification of the image. The third lens creates a virtual image along the third light path between the second mirror and the rear projection screen. A fourth lens may be positioned on either side of the projection screen, near the surface of the scree to act as a condenser lens that directs the main path of the light rays into a more collimated direction.

The angular arrangement of the third, viewing light path up and towards the user and the setback of the rear projection screen along the third light path combine to provide an impression to the viewer of seeing the specimen within the instrument, rather than as an artificial image projected on a screen. The enlarged projection image is viewed by looking into the microscope in the general direction of the specimen. This is an important consideration when the microscope is to be used by children. The embodiment in which two mirrors and two lenses are used provides proper parity so that a lower case p does not look like a lower case q; this also maintains proper left-right and up-down movement so that moving the specimen up and to the left moves the projection image up and to the left as well.

One of the key features of the invention is the positioning of the various optical elements of the optical train to create a folded light path having a first, vertical light path, a second downwardly extending light path and a third, viewing light path extending upwardly and at an acute viewing angle to the horizontal. This arrangement lengthens the light path length thus increasing the total magnification for lenses of a certain power. The length of the folded light path is maximized by positioning the first mirror, which intersects the first and second light paths, near the viewing chamber and the second mirror near the base plane.

The configuration of the housing, in conjunction with the angular orientation of the third, viewing light path, provides the invention with several additional advantages. First, positioning the rear projection screen at the base of the viewing chamber provides the viewer with an illusion of depth so that the viewer has a better sense of seeing the actual specimen, rather than a displaced and projected image of the specimen. This illusion of depth is enhanced when a third lens is mounted in viewing chamber. The third lens moves the virtual image from the projection screen back down the third light path toward the second mirror so the virtual image is even further away from the viewer than the rear projection screen. Also, the viewing chamber is sized to reduce the ambient light impinging upon the projection screen thus increasing the brightness of the image. All these features are combined with orienting the third, viewing light path at a comfortable, acute viewing angle up and towards the user, about 45° in the preferred embodiment, to create a microscope which is easy to use even by children.

Other features and advantages of the invention will appear from the following description in which the preferred embodiment has been set forth in detail in conjunction with the accompanying drawing.

BRIEF DESCRIPTION OF THE DRAWING

FIG. 1 is a perspective view showing a single eyepiece binocular microscope made according to the invention.

FIG. 2 is a schematic side view of the microscope of FIG. 1.

DETAILED DESCRIPTION OF THE PREFERRED EMBODIMENT

Referring now to the Figures, a single eyepiece binocular microscope 2 is shown to include a housing 4 having a generally horizontal base 6 defining a horizontal base plane 8. An optical train is mounted within housing 4 and includes several optical elements including a first, objective lens 12 positioned near base plane 8 and immediately above a specimen receiving area 14 at which a specimen 16 is mounted. A light source 18 is positioned below specimen area 14 to provide a source of light for objective lens 12. For lower magnifications, lighting from above may also be provided from light source 18a. Light travels along a first, vertical light path 20 between objective lens 12 and a first mirror 22. A second lens 24 is positioned along path 20 near first mirror 22, and beyond the real image 26 created by lens 12. First mirror 22 is positioned so that light passing along path 20 is directed along a second light path 28 at an angle 30 to horizontal base plane 8. Second light path 28 extends downwardly away from an observer 40 until it reaches a second mirror 32 positioned near base plane 8. Second lens 24 may be positioned along second light path 28, as indicated by second lens 24a in FIG. 1.

Second mirror 32 is oriented so that light along second light path 28 is reflected back along a third. viewing light path 34. Path 34 is at a viewing angle 36 relative to horizontal base plane 8. Angle 30, in preferred embodiment, is about 30° while angle 36 is about 45°. Third light path 34 extends from second mirror 32, through a rear projection screen 38 and continues up and towards observer 40. A projection image 42 of specimen 16 is formed on rear projection screen 38 for viewing by observer 40. Image 42 preferably coincides with the real image created by second lens 24.

Housing 4 includes an opaque walled viewing chamber 44 above rear projection screen 38. Viewing chamber 44 has an axial length 52 which, in this preferred embodiment, is greater than its diameter 54 to substantially shield screen 38 from ambient light. Microscope 2 is a relatively large instrument with diameter 54 of about 4 inches. Axial length 52 may be less than diameter 54 and still provide adequate shading for screen 38, especially with smaller microscopes, or when the viewing chamber opening 48 is not round.

Viewing chamber 44 has a third lens 46 at the viewing chamber opening 48 to provide further magnification of projection image 42 for viewer 40. (Lenses 12, 24 and 46 and mirrors 22, 32 constitute the optical train.) Providing third lens 46 also creates a virtual image 50 along third light path 34 between rear projection screen 38 and second mirror 32. Thus viewing chamber 44, coupled with the provision of viewing angle 36, provides observer 40 with a feeling or sensation that one is looking at specimen 16 directly and within microscope 2, not at a spatially displaced, projected image of the specimen on a screen. The use of third lens assists in the creation of this illusion by creating virtual image 50 downstream from rear projection screen 38.

During use the user positions a specimen 16 beneath objective lens 12 at specimen receiving area 14. Light from light source 18 illuminates specimen 16 from beneath and travels along first, second and third light paths 20, 28 and 34. The length of the light path from objective lens 12 to rear projection screen 38 is maximized by positioning first mirror 22 adjacent viewing chamber 44 and second mirror 32 near base plane 8. Observer 40 then manipuates specimen 16 until the projection image 42 is that which is desired. Viewing chamber opening 48 is sufficiently wide. so that both eyes can be used in viewing projection image 42. This, plus the orientation of third light path 34 at an appropriate viewing angle 36, helps to make using microscope 2 easy and nontiring. even for younger children. By the use of lenses 12, 24 and mirrors 22, 32, left-right parity is achieved and movement of projection image 42 follows movement of specimen 16.

Modification or variation can be made to this enclosed embodiment without departing from the subject of the invention as defined in the following claims. Third lens 46 could be eliminated; this would make the image presented to the viewer somewhat smaller and would effectively relocate virtual image 50 to coincide with projection image 42. Viewing chamber opening 48 could be horizontal, oval, rectangular or kidney shape to minimize stray light entering the chamber while preserving the ability of both eyes to see projection screen 38. A condensing lens could be mounted near projection screen 38 on either side of screen 38 to collimate the light passing along light path 34 towards observer 40.

I claim:

1. A single eyepiece binocular microscope for viewing a specimen by an observer comprising:
   a microscope housing including a base defining a horizontal base plane;
   an optical train including, in order, a first, objective lens mounted to the housing above a specimen receiving area, a first mirror mounted to the housing at a first position vertically above the first lens, a second mirror mounted to the housing at a second position, and a rear projection screen mounted to the housing at a third position;
   a light source for illuminating the specimen receiving area;
   the first lens and the first mirror defining a first vertical light path;
   the first mirror and the second mirror defining a second light path therebetween;
   the second mirror and the rear projection screen defining a third light path from the second mirror and through the rear projection screen;
   the first, second and third light paths constituting an optical path;
   the verticall position of the second mirror being at or below the elevation of the half-way point between the first lens and the first mirror;
   the second light path extending downwardly and away from the observer at an acute reflection angle to the base plane of substantially less than 90°;
   the housing including an open-ended viewing chamber having light blocking circumferential walls extending generally coaxially with the third axis outwardly from the third position to a viewing opening at one end in the viewing chamber;
   the third light path extending upwardly and towards the observer at an acute, viewing angle to the base plane, the third light path passing back over the specimen with at least a portion of the viewing opening being positioned horizontally between a user and the first and second light paths to give the user unobstructed visual and physical access to the specimen; and
   the first position being adjacent the viewing chamber and the second position being adjacent the base plane to maximize the length of the optical path.

2. The microscope of claim 1 further comprising: a second lens mounted to the housing along the optical path near the first mirror on a chosen side of the first mirror along the optical path, the second lens mounted beyond the real image formed by the first 3. The microscope of claim 2 wherein the second lens is positioned along the first light path.

4. The microscope of claim 2 wherein the second lens is positioned along the second light path.

5. The microscope of claim 1 further comprising a third lens mounted within the viewing chamber at a fourth position along the third light path.

6. The microscope of claim 5 wherein the fourth position is at the viewing opening.

7. The microscope of claim 1 wherein the first lens is positioned near the base plane.

8. The microscope of claim 1 wherein the viewing angle is about 45°.

9. A single eyepiece binocular microscope for viewing a specimen by an observer comprising:
- a microscope housing including a base defining a horizontal base plane;
- an optical train including, in order, a first, objective lens mounted to the housing above a specimen receiving area and forming a first real image, a first mirror mounted to the housing at a first position vertically above the first lens, a second mirror mounted to the housing at a second position, and a rear projection screen mounted to the housing at a third position;
- a light source for illuminating the specimen receiving area;
- the first lens and the first mirror defining a first, vertical light path;
- the first mirror and the second mirror defining a second light path therebetween;
- the second mirror and the rear projection screen defining a third light path from the second mirror and through the rear projection screen;
- the first, second and third light paths constituting an optical path;
- the vertical position of the second mirror being at or below the elevation of the half-way point between the first lens and the first mirror;
- a second lens mounted to the housing along the optical path near the first mirror on a chosen side of the first mirror along the optical path, the second lens mounted beyond the first real image;
- the second light path extending downwardly and away from the observer at an acute reflection angle to the base plane of less than 45°;
- the housing including an open-ended viewing chamber having light blocking circumferential walls extending generally coaxially with the third axis outwardly from the third position to a viewing opening at one in the viewing chamber, the viewing chamber configured to inhibit ambient light from striking the rear projection screen;
- the third light path extending upwardly and towards the observer at an acute, viewing angle to the base plane of about 45°, the third light path passing back over the specimen with at least a portion of the viewing opening being positioned horizontally between a user and the first and second light paths to give the user unobstructed visual and physical access to the specimen; and
- the first position being adjacent the viewing chamber and the second position being adjacent the base plane to maximize the length of the optical path.

10. The microscope of claim 9 further comprising a third lens mounted within the viewing chamber along the third light path at the viewing opening.

* * * * *